I. NEWTON.
Dies for Making Carriage-Bolts.

No. 225,532. Patented Mar. 16, 1880.

Witnesses.
J. S. Parmalee
J. T. Sargent

Inventor.
I. Newton
per W. H. Burridge
Atty.

UNITED STATES PATENT OFFICE.

ISAAC NEWTON, OF CLEVELAND, OHIO.

DIE FOR MAKING CARRIAGE-BOLTS.

SPECIFICATION forming part of Letters Patent No. 225,532, dated March 16, 1880.

Application filed December 1, 1879.

*To all whom it may concern:*

Be it known that I, ISAAC NEWTON, of Cleveland, in the county of Cuyahoga and State of Ohio, have invented a certain new and Improved Carriage-Bolt and Dies for the same; and I do hereby declare that the following is a full, clear, and complete description thereof.

This invention relates to an improvement in bolts for carriage-work and dies for the same. The object is to prevent the said bolts from turning in the wood in which they are used while screwing up the nut by making that part of the shank of the bolt directly under the head thereof square, and by forming from said square certain elongated projections on the round part of the shank, which projections settle into the sides of the bolt-hole and prevent the bolt from turning while the nut is being screwed up, as aforesaid. The said projections are forced out from the metal by the action of dies at one operation while forming the head and square part of the shank. Said bolt can also be used in connection with metals provided with square bolt-holes, as hereinafter shown.

The invention is an improvement on a bolt for which a patent was granted to me the 12th day of August, 1873.

A more full and complete description of the invention is as follows, reference being had to the accompanying drawings, making a part of this specification, in which—

Figure 1:
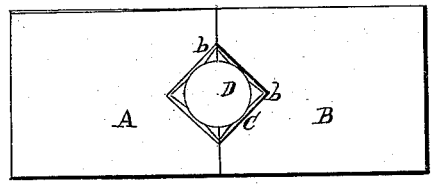
Figure 2:
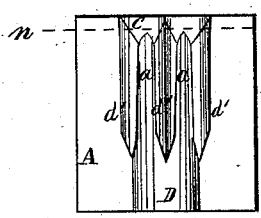
Figure 3:
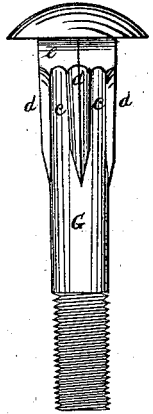
Figure 4:
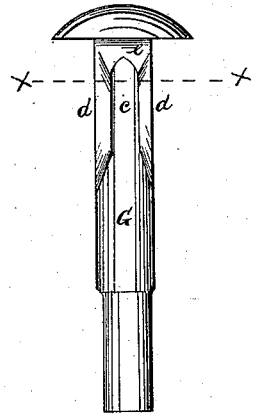
Figure 5:

Figure 1 is a plan view of a two-part die in which the bolts alluded to are made. Fig. 2 is a view of the face of one part of the die. Figs. 3 and 4 are side views of a bolt in different positions. Fig. 5 is a transverse section of a bolt, taken in the line $x\ x$.

Like letters of reference refer to like parts in the several views.

The bolt above alluded to, for which a patent was granted to me, was so made that the part of the bolt directly under the head was square, and on each of the sides forming the square was a projection or rib which would sink into the sides of the bolt-hole and prevent the bolt from turning when screwing up the nut. Said bolt could be used only in wood provided with round bolt-holes, so that the ribs or feathers alluded to could settle into the soft material for the purpose specified. The bolt could not be used in the iron-work of a carriage having either a square hole or a round one for the bolt, for the reason that the feathers could not sink into the sides of a round hole on account of the hardness of the iron; nor would the bolt fit in a square bolt-hole because of the ribs, which were in the way; hence the bolt had but a limited use.

To avoid this objectionable feature, and to make a bolt adapted to either wood or iron, which can be used without its turning when the nut is being screwed up in either a square or a round bolt-hole, is the purpose of this invention. To this end is used a two-part die, (shown in Fig. 1,) in which the bolt is headed. Said die consists of sections A and B. The upper part, C, of the hole in the die is squared by cutting the corners $b$ in the sides thereof to form a square on the shank of the bolt directly under the head, as seen at $e$ in Figs. 3 and 4. Said square may extend downward more or less, as shown in the drawings.

Extending downward from the square $e$ of the bolt are elongated projections or ribs $d$, formed by cutting away the sides of the hole D of the die, thereby forming in the sides of the hole grooves $d'$, Fig. 2, corresponding to said ribs. The lower ends of the grooves terminate gradually in the hole D, making the said ribs slightly tapering downward from the square part $e$ of the shank, as seen in Fig. 3.

The above-described bolt is made from a round piece of iron or blank, one end of which, on being heated for forming thereon the head, and for the purpose of being upset in the die to form the square and ribs on the shank above described, is inserted in the die and clamped therein by the round part D, so much of the heated blank projecting above the die as to fashion the head.

By means of a heading-tool that part of the blank inclosed in the die is upset, thereby expanding it and forcing the heated metal into the corners $b$ and the grooves $d'$ of the die, by which is formed the full square part $e$ directly under the head and the elongated projections or ribs along the shank of the bolt, as shown in the drawings.

During the operation of forming the ribs, &c., the head of the bolt is formed by the heading-tool by the upsetting and expanding the end of the blank projecting above the die.

It will be obvious that a bolt thus made will fit in a square hole, so that the iron-work of a carriage having square bolt-holes therein can be bolted to the wood-work thereof, and that the bolt, when used in wood having round bolt-holes, cannot turn therein when screwing up the nut, as the elongated projections or ribs will sink into the sides of the hole and prevent the bolt from turning, as aforesaid; hence for all purposes for which bolts are used it is more widely useful than the bolt for which I obtained the said patent.

It may be proper to remark here that by having the ribs tapering slightly downward and terminating rather abruptly the square part of the shank is not liable to split the wood when the bolt is being driven into a round hole, as the lower end of the projections will gradually cut and shape the hole for the square part under the head. It is scarcely safe to force an ordinary round and square shank-bolt which is without these projections.

What I claim as my invention, and desire to secure by Letters Patent, is—

The bolt-making die herein described, in two parts, A and B, the bore of which at the upper end is cut away so as to form a square section, C, in which to shape a short square neck to the bolt immediately below the head, and from the angles of said square sections indentations or grooves $d'$, extending downward to form on the round part or shank of the bolt projections or ribs $d$, substantially as set forth.

ISAAC NEWTON.

Witnesses:
W. H. BURRIDGE,
J. H. BURRIDGE.